United States Patent [19]
Boese et al.

[11] 3,842,333
[45] Oct. 15, 1974

[54] NON-POLLUTION MOTOR UNITS

[76] Inventors: Harold L. Boese; Thomas R. Hencey, Jr., both of 1615 Ave. A, Galveston, Tex. 77550

[22] Filed: July 21, 1972

[21] Appl. No.: 273,684

Related U.S. Application Data

[63] Continuation-in-part of Ser. No. 106,651, Jan. 15, 1971, abandoned, which is a continuation-in-part of Ser. No. 94,814, Dec. 3, 1970, Pat. No. 3,681,609.

[52] U.S. Cl. .................... 320/2, 60/36, 180/54 B, 180/66 B, 290/2, 290/50, 320/61, 310/10
[51] Int. Cl. ........................................... F01k 15/02
[58] Field of Search ............. 310/10, 11, 52, 54, 40; 60/36, 39.46, DIG. 2, 57 T; 320/2, 61; 290/2, 50, 52; 180/66 B, 54 B, 65 R, 66 R; 123/119 B

[56] References Cited
UNITED STATES PATENTS

| | | | |
|---|---|---|---|
| 657,124 | 9/1900 | Libbey | 180/66 B |
| 672,256 | 4/1901 | Bobrick | 60/36 |
| 3,232,050 | 2/1966 | Robison et al. | 60/36 |
| 3,609,418 | 9/1971 | Halas | 310/10 |
| 3,681,609 | 8/1972 | Boese et al. | 60/36 X |

*Primary Examiner*—J. D. Miller
*Assistant Examiner*—Robert J. Hickey
*Attorney, Agent, or Firm*—Clarence A. O'Brien; Harvey B. Jacobson

[57] ABSTRACT

Non-pollution motor units, wherein a cryogenic liquid, such as liquid nitrogen, is evaporated to drive a gas motor, the gas motor in turn driving an alternator (electrical generator) the output from which is used to drive an electric drive motor. The electric drive motor and alternator are operated at very low temperatures so that their operating characteristics are greatly improved, evaporation of the cryogenic liquid being used to achieve the cooling. In the motor units, the gas motor, alternator and electric drive motor are preferably mounted within an insulated case or housing cooled by flowing the cryogenic liquid therethrough. The electric drive motor is useful to drive any driven equipment, of whatever character, without pollution of the environment.

9 Claims, 2 Drawing Figures

Harold L. Boese
Thomas R. Hencey, Jr.
INVENTORS

BY Carl B. Fox, Jr.

ATTORNEY

Harold L. Boese
Thomas R. Hencey, Jr.
INVENTORS

BY Carl B. Fox, Jr.

ATTORNEY

3,842,333

NON-POLLUTION MOTOR UNITS

REFERENCE TO EARLIER FILED APPLICATION

This application is a continuation-in-part of application Ser. No. 106,651 now abandoned, filed Jan. 15, 1971 by Harold L. Boese and Thomas R. Hencey, Jr. and entitled "Non-Pollution Motor Units;" application Ser. No. 106,651, filed Jan. 15, 1971 is a continuation-in-part of application Ser. No. 94,814, filed Dec. 3, 1970, entitled "Non-Pollution Motors," now U.S. Pat. No. 3,681,609.

SUMMARY OF THE INVENTION

The invention provides non-pollution motor units having a gas motor, and electrodynamic means comprising an alternator (electrical generator), and electric drive motor preferably assembled within a single housing or case. A cryogenic liquid, such as liquid nitrogen, is passed through the electric drive motor and through the alternator whereby the electric drive motor and alternator are maintained in very cold condition, the cryogenic liquid being evaporated and the resulting gas being used to drive the gas motor which in turn drives the alternator to produce electrical power. The electrical power is stored in storage batteries of any form, and electrical power from the batteries is used to drive the electric motor. Because the electric drive motor and alternator are operated at very cold temperatures, their efficiencies are greatly improved and considerably more power is derived from the units than would be expected under normal operation. Provision is preferably made for driving the electric drive motor at variable speeds, or the motor may be of constant speed design if desired. The motor unit operation is automatic in character so that the motor may be readily operated without complicated operating procedures being required.

The motor units are extremely economical in operation. Any cryogenic liquid may be employed for the motor units, and the cost thereof is considerably less than the cost of petroleum fuels with respect to the power derived from the drive motor per unit cost of fuel. Among the cryogenic liquids that may be used are liquid nitrogen, liquid carbon dioxide, liquid argon, krypton, and xenon. In fact, any other cryogenic liquid may be employed. Mixtures of cryogenic liquids may be employed under certain conditions, and it is feasible under proper conditions to utilize any liquefied gas for the motor units. Liquid air may be used.

The only exhaust gas from the motor units is the vaporized gas which is derived from cryogenic liquid. It is anticipated that the cryogenic fluids will be gases derived from the atmosphere, so return thereof to the atmosphere will restore to the atmosphere only what was originally removed from it. The advantages of the motor units are realized largely because the electric drive motor from which actual power is derived is operated at very cold temperatures. Additionally, the alternator which supplies electrical power within the system is operated at very cold temperatures. Since the cryogenic liquid may be in direct contact with the electric motor and alternator, the operating temperature of a motor unit will be limited to a temperature at or above the boiling temperature of the cryogenic liquid or liquids. The increased electric motor and alternator efficiencies are realized because the electrical resistances of the motor and alternator conductors are greatly reduced at the extremely cold operating temperatures and in addition it appears that an electrical corona discharge exists in the fields of the electric motor and alternator which further improves their operating efficiencies, whether or not the field space is filled with cryogenic liquid. As an example of the operating temperatures which may be achieved, liquid nitrogen has a boiling temperature of −320° F., so that a motor unit utilizing liquid nitrogen could have its electric drive motor and alternator operating at a temperature as low as −320° F.

Other objects and advantages of the invention will appear from the following detailed description of preferred embodiments thereof, reference during the description being made to the accompanying drawings.

BRIEF DESCRIPTIONS OF THE DRAWINGS

DESCRIPTION OF THE PREFERRED EMBODIMENTS

Figure 1:
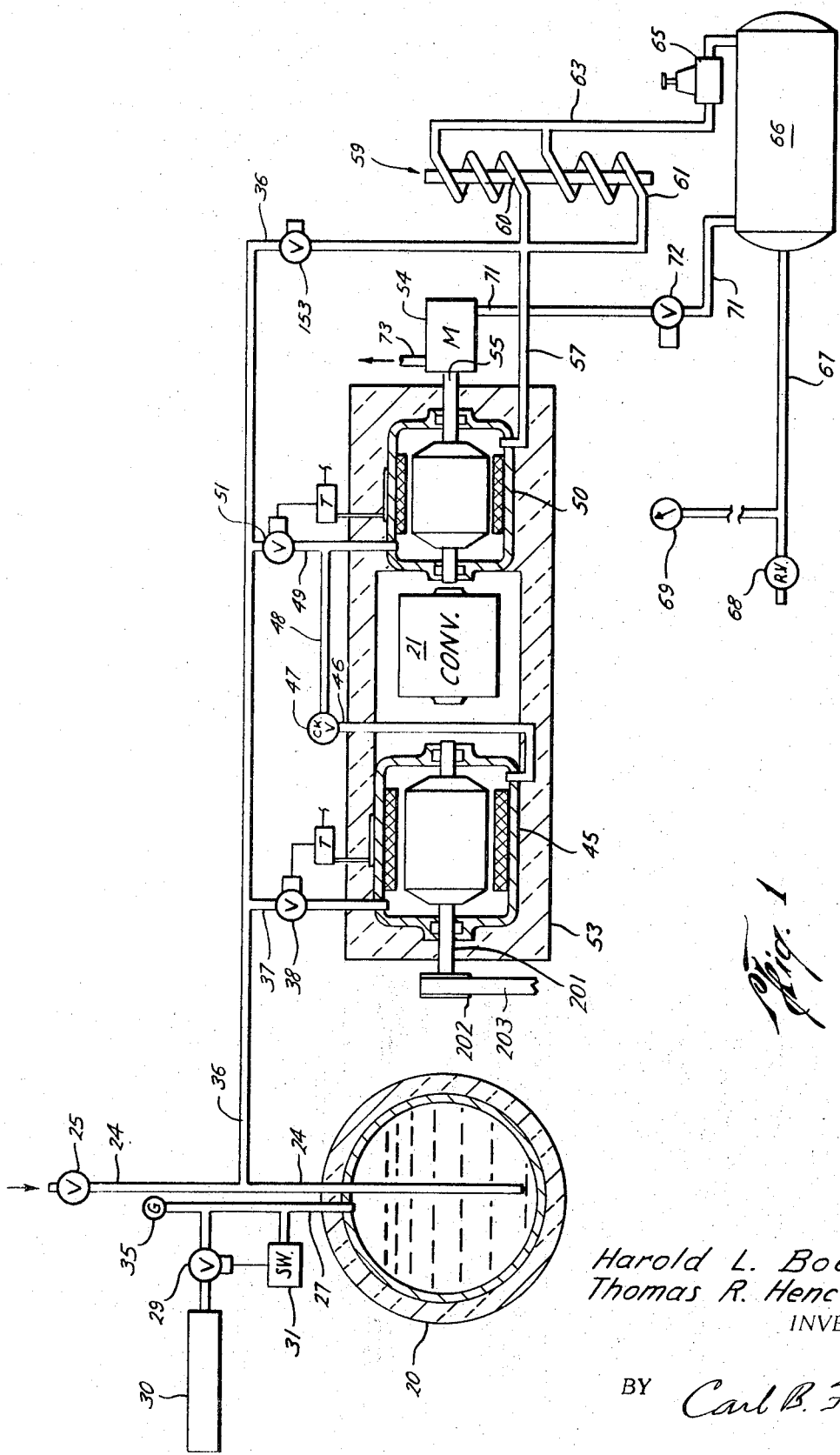
FIG. 1 is a preferred embodiment of flow diagram for a non-pollution motor unit according to the invention, showing the gas motor, alternator, and electric drive motor as a unitary assembly.

Referring first to FIG. 1 of the drawings, an insulated tank 20 is filled with a cryogenic liquid, for example liquid nitrogen, through a conduit 24 having a closure valve 25, the conduit 24 being downturned to open at the lower part of the interior of tank 20. A purge conduit 27 from tank 20 connects to valve 29 and muffler 30. Electrical pressure switch 31 is closed to energize the solenoid of solenoid valve 29, upon occurence of excessive pressure within tank 20. Valve 29 opens to purge gas from tank 20 when the tank is being filled with cryogenic liquid in order to prevent excessive pressures within the tank 20, valve 25 also being opened during filling of the tank. Pressure gauge 35 indicates the pressure in tank 20.

Conduit 36 and branch conduit 37, the latter having a solenoid operated valve 38 therein, convey cryogenic liquid to the interior of the housing of electric drive motor 45. Valve 38 is thereostatically controlled to open when the temperature at motor 45 becomes too high. Liquid is removed from the motor housing through conduit 46, which has mono-directional check valve 47 to prevent backflow. From valve 47, cryogenic liquid is conveyed through conduits 48, 49 into the housing of alternator 50. Solenoid operated valve 51 is opened by increase of temperature at the alternator housing to pass additional cryogenic liquid through the alternator housing when required to maintain its temperature at the desired level. The electric drive motor 45 and alternator 50 are enclosed within an insulated case or housing 53. A gas motor 54 is mounted at the end of housing 53 to directly drive alternator 50 through shaft 55.

Alternatively, liquid cryogenic fuel such as liquid nitrogen may be flowed into one end or side of housing 53, and circulated therethrough to exit at another point of the housing to cool one or all of the electric motor 45, the converter 21, and the alternator or generator 50. In this case, any or each of the electric motor, alternator or generator, and converter may be designed to admit the cryogenic liquid into their individual housings or cases, or not. Partitions making separate chambers for each element within housing 53 may be provided, with separate controlled cryogenic liquid flow to each chamber. Regardless of the exact arrangement, the elements within housing 53 will be cooled by the cryogenic fluid.

It will be realized that the better the heat exchange between the electric motor, alternator or generator, and/or the converter, the more their operating efficiencies will be improved, and the greater will be the electrical power generation and efficieny of the entire unit. Direct contact of the cryogenic fluid with the heat-producing electrical components therefore improves the efficiency of the unit.

Liquid leaves the alternator housing through conduit 57 which branches to deliver the liquid through two parallel passes of evaporator 59. Part of the liquid passes through evaporator coil 60 and the other part of the liquid passes through evaporator coil 61. Manifold pipe 63 delivers the evaporated gas through pressure regulating valve 54 into surge tank 66. Surge tank 66 is equipped with a conduit 67 leading from the interior thereof to pressure regulating bleed valve 68 and pressure gage 69.

Gas is passed from surge tank 66 through conduit 71 having pressure regulating valve 72 therein. The gas is delivered to drive gas motor 54, from which the spent gas is exhausted through exhaust conduit 73. Gas motor 54 drives alternator 50, the operation being intermittant to maintain the charges of the storage batteries. When the battery charges drop, the electric circuit "calls for" additional operation of the gas motor and alternator to recharge the batteries to the required level. Exhaust gas from conduit 73 is blown across resistor coils 74, 75, to be described later. The gas is then exhausted to the atmosphere.

Figure 2:
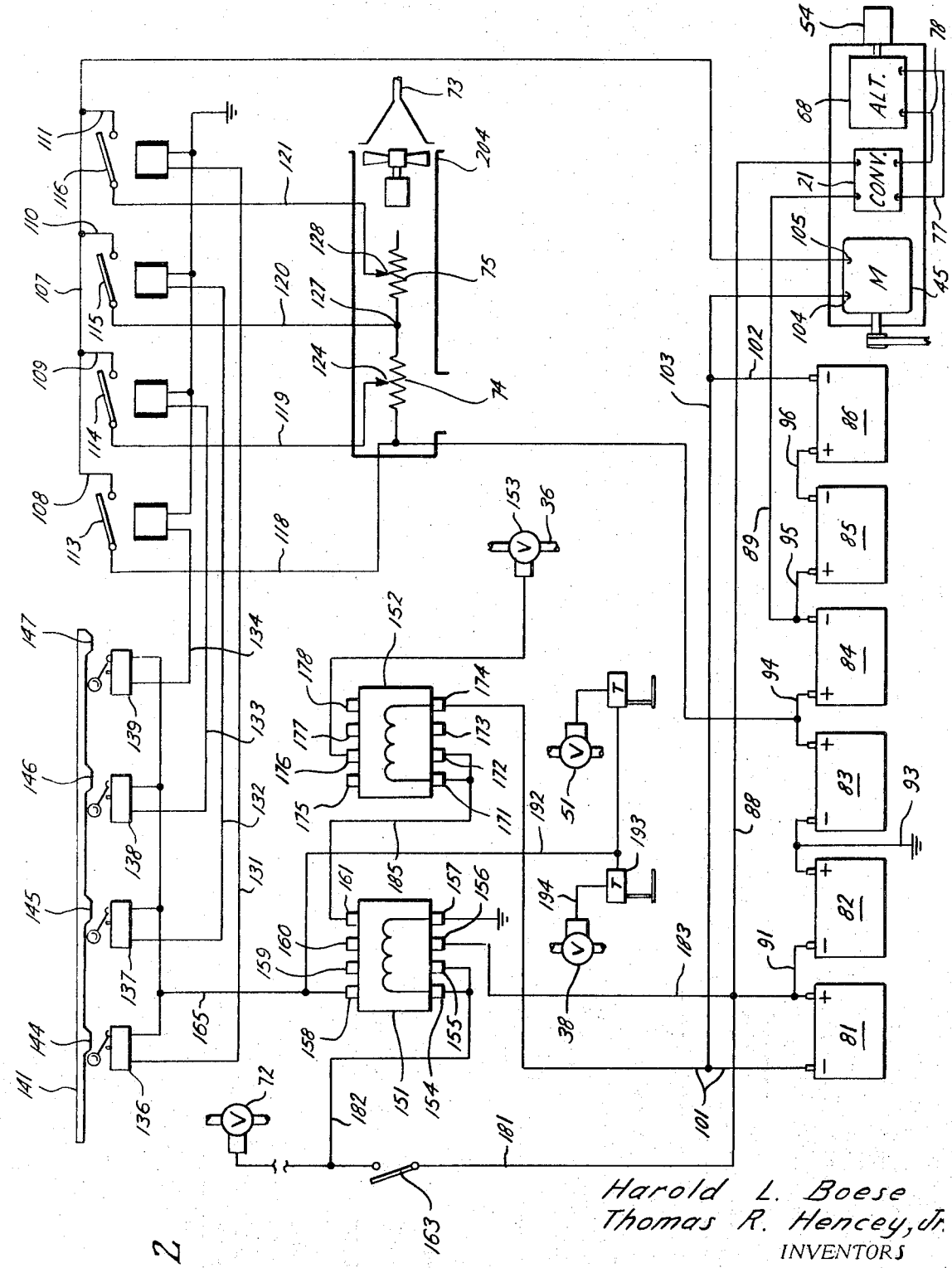
FIG. 2 is an electrical circuit diagram for the motor unit shown in FIG. 1.

The motor may not be operated unless a switch 163 is turned "on," to open valve 72 to permit pressured gas to operate gas motor 54 (see FIG. 2).

Alternator 50 is connected by conductors 77, 78 to battery converter 21. The output of alternator 68 is 220 volt alternating current (AC), and converter 21 converts the alternator output to 110 volt direct current (DC). Lead cell storage batteries 81–86, 5–24 volt, are charged by converter 21 through conductors 88, 89, conductor 88 being connected to the positive terminal of battery 81 and conductor 89 being connected to the positive terminals of batteries 83, at conductor 94.

The positive terminal of battery 81 is connected to the negative terminal of battery 82 by conductor 91. The positive terminal of battery 82 is connected to the negative terminal of battery 83 by conductor 92, which is grounded at 93. The positive terminals of batteries 83, 84 are connected by conductor 94. The negative terminal of battery 84 is connected to the positive terminal of battery 85 by conductor 95. The negative terminal of battery 85 is connected to the positive terminal of battery 86 by conductor 96.

Conductors 101, 102 and 103 connect the negative terminals of batteries 81, 86 to the terminal 104 of motor 45. The other terminal 105 is connected by conductor 107 and branch conductors 108–111 to one terminal of each of switches 113–116. The other terminals of switches 113–116 are connected by conductors 118–121, respectively, to one end of resistor 74, to the conductor connecting the other end of resistor 74 to resistor 75 at 127, and to an intermediate point of resistor 75 at 128.

Switches 113–116 are solenoid operated and 24 volt DC electrical current is supplied thereto through conductors 131–134, respectively. Conductors 131–134 are energized respectively by closing of switches 136–139. Switches 136–139 are closed by movements of elongate switch actuator 141 toward the left, as it is depicted in the drawing, and which is biased toward the right by a spring (not shown).

Actuator 141 has projecting contacts 144–147 which are spaced such that, upon initial movement toward the left, contact 144 first depresses the lever of switch 136. Upon further movement of actuator 141 toward the left, while contact 144 is still depressing switch 136 to close it, contact 145 closes switch 137. Still further movement of actuator 141 to the left causes contact 146 to close switch 138, switch 137 remaining closed until after switch 138 has been closed. Still further final movement of actuator 141 to the left causes contact 147 to move to the left to depress and close switch 139, this being done while switch 138 remains closed. Each switch of the series, after the first switch, is closed while the preceeding switch remains closed, but after succeeding switch is closed the actuator 141 moves sufficiently so that the next preceeding switch is opened. Therefore, actuator 141 closes switches 136–139 successively so that switches 113–116 are successively closed in the same order to operate motor 45 at successively increased speeds. The motor will operate at the speed corresponding with whichever of the switches 136–139 and 113–116, respectively, are closed. In other words, closing of switch 113 gives lowest speed to motor 45, and switches 114, 115, 116 give increasingly higher speeds when closed.

Switches 151, 152 are double-pole, double-throw 24 volt switches. Switch 151 has terminals 154–157 and 158–161. Switch 163 is closed to turn on the motor unit, to energize and close switch 151 and switch 152. One side of each of switches 136–139 is connected by conductor 165 to terminal 158 of switch 151, so that closing of switches 136–139 causes motor 45 operation only when the switch 163 is closed. Switch 152 has terminals 171–174 and 175–178.

Conductors 181, 182 respectively connect one side of switch 163 to a conductor 183 leading from conductor 91 to terminal 156 of switch 151, and the other side of switch 163 to terminals 154–155 of switch 151. Terminal 157 of switch 151 is grounded. Terminals 159–160 of switch 151 are not used. Terminal 161 is connected by a conductor 185 to terminals 171–172 of switch 152. Terminal 173 of switch 152 is not used. Terminal 174 of switch 152 is connected by conductor 101 to the negative terminal of battery 81. Terminals 175, 177 and 178 of switch 152 are not used. Terminal 176 is connected to solenoid valve 39. Switch 152, which as stated is a 24 volt double-pole, double-throw relay switch, is not used as such, but instead is used as a 12 volt sensing relay.

Motor 45 and alternator 50 are completely enclosed within the insulation of housing 53, which serves to maintain the motor and alternator in very cold condition because of the cooling effect of liquid nitrogen flowing therethrough. Tank 20 is a cryogenic insulated tank, and liquid nitrogen therein is maintained at elevated pressure, for example, at 130 pounds per square inch. A conductor 192 connects terminal 158 of relay switch 151 to one side of temperature control switch 193, the other terminal of which is connected to the solenoid of solenoid valve 38, by a conductor 194. When the temperature at drive motor 45 becomes too elevated, temperature control switch 193 is closed to cause opening of solenoid valve 38 so that additional cold liquid nitrogen will flow to maintain motor 45 in cold condition. Relay switch 151 opens solenoid valve 51 to cause flow of cryogenic liquid through alternator 50 when the alternator temperature becomes too high. Relay switch 152 opens solenoid valve 153 in conduit 36 to cause flow of cryogenic liquid to the evaporator when the voltage output of the set of batteries 81–86 drops below 12 volts. Therefore, gas motor 54 is cause to operate alternator 50 to charge the set of lead cell batteries 81–86 when required.

A fan or blower 204 may be provided to blow gas over the resistors 74, 75.

The pressure in surge tank 66 will usually be a pressure up to 150 pounds per square inch. The evaporator 59 temperature will usually be from about 65° F. to about 70° F. Operating pressures, temperatures, and the like, may be considerably varied throughout the system, while maintaining benefits thereof.

As has been stated, the non-polluting motor units afforded by the invention may be employed as power sources in any service, including use in automotive vehicles. The electrical power produced by alternator 50 may be used to supply electrical power for other purposes than to charge batteries 81–86 and to operate electric motor 45.

Motor 45 has shaft 201 on which sheave 202 is carried, the power output from the motor unit being transmitted through belt 203 to whatever equipment is to be driven by the motor unit.

Certain elements of the electrical circuit may be supplied by or supplanted by internal elements of drive motor 45. In other words, drive motor 45 may be a motor of the type which has internal switches which perform the functions of switches 113–116 and/or switches 136–139, so that speed adjustments of the drive motor are achieved through the motor circuitry. Such motors are commercially available, and may be employed in connection with the invention, with suitable revision of the motor unit control circuit.

The power derived from the motor units is very high, up to at least about fifteen to twenty times the power that the electric drive motor would be capable of producing at ambient temperatures. The alternator is well able to maintain the charges of the storage batteries so that continuously sustained operation of the motor units is realized so long as the fuel supply is maintained. The unit may be started with the storage batteries substantially completely uncharged, and the alternator operation will charge the storage batteries to proper charge.

The motor units do not use any external heat source except the air-heated evaporators 59, over which air at ambient temperature passes. Ambient temperature has a fairly broad range at different seasons, say, from −100° F to +120° F. The motor units will operate under these and even colder or hotter temperatures. As long as the temperature is significantly above the boiling temperature of the cryogenic liquid, the motor units will operate effectively.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

We claim:

1. A non-polluting power generating system, comprising a source of liquefied gas under pressure having a boiling temperature less than ambient temperature of the atmosphere, a gas motor, electrodynamic means driven by the gas motor for producing a mechanical output, fluid circuit means for conducting said liquefied gas from the source in heat exchange relation to the electrodynamic means to cool the same, evaporating means conducting the liquefied gas from the electrodynamic means in heat exchange relation to the atmosphere at said ambient temperature for supply of evaporated gas to the gas motor, means connected to the gas motor for exhausting said evaporated gas to the atmosphere, said electrodynamic means including a generator driven by the gas motor to produce an electrical alternating current output, insulated housing means enclosing the generator in heat transfer relation to the fluid circuit means, and control means for controlling the amount of liquefied gas passed into heat transfer relation to said generator.

2. A non-polluting power generating system, comprising a source of liquefied gas under pressure having a boiling temperature less than ambient temperature of the atmosphere, a gas motor, electrodynamic means driven by the gas motor for producing a mechanical output, fluid circuit means for conducting said liquefied gas from the source in heat exchange relation to the electrodynamic means to cool the same, evaporating means conducting the liquefied gas from the electrodynamic means in heat exchange relation to the atmosphere at said ambient temperature for supply of evaporated gas to the gas motor, means connected to the gas motor for exhausting said evaporated gas to the atmosphere, control means connected to the electrodynamic means for selectively varying the mechanical output, and means connected to the gas exhausting means for discharging the evaporated gas to atmosphere through the control means to cool the same.

3. The combination of claim 2 wherein said electrodynamic means includes a generator driven by the gas motor to produce an electrical output and insulated housing means enclosing the generator in heat transfer relation to the fluid circuit means.

4. The combination of claim 3 wherein said electrodynamic means further includes means enclosed within said insulated housing means for converting the electrical output of the generator into direct current and battery means connected to the converting means for storing the converted electrical output of the generator.

5. The combination of claim 4 wherein the electrodynamic means still further includes an electric motor energized by said battery means to produce said mechanical output.

6. The combination of claim 5 wherein said fluid circuit means conducts the liquefied gas in heat transfer relation to the converting means within the insulated housing means.

7. A non-polluting power generating system, comprising a source of liquefied gas under pressure having a boiling temperature less than ambient temperature of the atmosphere, a gas motor, electrodynamic means driven by the gas motor for producing a mechanical output, fluid circuit means for conducting said liquefied gas from the source in heat exchange relation to the electrodynamic means to cool the same, evaporating means conducting the liquefied gas from the electrodynamic means in heat exchange relation to the atmosphere at said ambient temperature for supply of evaporated gas to the gas motor, means connected to the gas motor for exhausting said evaporated gas to the atmosphere, said electrodynamic means further including means enclosed within said insulated housing means for converting the electrical output of the generator into direct current and battery means connected to the converting means for storing the converted electrical output of the generator, said fluid circuit means conducting the liquefied gas in heat transfer relation to the converting means within the insulated housing means.

8. A non-polluting power generating system, comprising a source of liquefied gas under pressure having a boiling temperature less than ambient temperature of the atmosphere, a gas motor, electrodynamic means driven by the gas motor for producing a mechanical output, fluid circuit means for conducting said liquefied gas from the source in heat exchange relation to the electrodynamic means to cool the same, evaporating means conducting the liquefied gas from the electrodynamic means in heat exchange relation to the atmosphere at said ambient temperature for supply of evaporated gas to the gas motor, means connected to the gas motor for exhausting said evaporated gas to the atmosphere, said electrodynamic means further including means enclosed within said insulated housing means for converting the electrical output of the generator into direct current and battery means connected to the converting means for storing the converted electrical output of the generator, the electrodynamic means still further including an electric motor energized by said battery means to produce said mechanical output.

9. Combination of claim 8, including control means for controlling the amounts of liquefied gas passed into heat transfer relation to said electric motor and said electrical generator.

* * * * *